United States Patent
Asjadi

(10) Patent No.: US 9,503,297 B2
(45) Date of Patent: Nov. 22, 2016

(54) 6MHZ BANDWIDTH OFDM TRANSMITTER WITH THE SAME GUARD INTERVAL AS 8MHZ DVB-T2

(71) Applicant: SONY CORPORATION, Tokyo (JP)

(72) Inventor: Gholam Hosein Asjadi, Guildford (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/771,282

(22) PCT Filed: Feb. 28, 2014

(86) PCT No.: PCT/GB2014/050591
§ 371 (c)(1),
(2) Date: Aug. 28, 2015

(87) PCT Pub. No.: WO2014/140523
PCT Pub. Date: Sep. 18, 2014

(65) Prior Publication Data
US 2016/0006593 A1 Jan. 7, 2016

(30) Foreign Application Priority Data
Mar. 13, 2013 (GB) .................................. 1304529.9

(51) Int. Cl.
*H04L 27/00* (2006.01)
*H04L 27/26* (2006.01)

(52) U.S. Cl.
CPC ....... *H04L 27/2605* (2013.01); *H04L 27/2611* (2013.01); *H04L 27/2628* (2013.01); *H04L 27/2666* (2013.01)

(58) Field of Classification Search
None
See application file for complete search history.

(56) References Cited

U.S. PATENT DOCUMENTS

| | | | |
|---|---|---|---|
| 6,898,198 B1 * | 5/2005 | Ryan | H04L 1/0002 370/252 |
| 2010/0054314 A1 * | 3/2010 | Korobkov | H04L 1/0007 375/222 |
| 2010/0328541 A1 | 12/2010 | Wu | |
| 2012/0213214 A1 | 8/2012 | Vermani et al. | |
| 2014/0294124 A1 | 10/2014 | Atungsiri et al. | |
| 2015/0163085 A1 | 6/2015 | Stadelmeier et al. | |
| 2015/0236818 A1 | 8/2015 | Qi et al. | |

OTHER PUBLICATIONS

U.S. Appl. No. 14/435,556, filed Apr. 14, 2015, Junge Qi, et al.
U.S. Appl. No. 14/437,417, filed Apr. 21, 2015, Junge Qi, et al.

(Continued)

*Primary Examiner* — Adolf Dsouza
(74) *Attorney, Agent, or Firm* — Oblon, McClelland, Maier & Neustadt, L.L.P.

(57) ABSTRACT

A transmitter transmits data to a receiver using OFDM symbols including plural sub-carrier symbols, some carrying data symbols and some carrying pilot symbols. A data formatter can form the data for transmission into sets of data symbols for each OFDM symbol, and an OFDM symbol builder can receive each set of data symbols from the data formatter and combine the data symbols with pilot symbols. A modulator can map the data symbols and the pilot symbols onto modulation symbols and modulate the plural sub-carriers to form the OFDM symbols. An inverse Fourier transform can convert the OFDM symbols from the frequency domain to the time domain, and a guard interval inserter can add a guard interval to each of the OFDM symbols by copying a part of the OFDM symbols and appending the copied part sequentially in the time domain to the OFDM symbols.

10 Claims, 16 Drawing Sheets

(56) References Cited

OTHER PUBLICATIONS

U.S. Appl. No. 14/721,886, filed May 26, 2015, Gholam Hosein Asjadi.
U.S. Appl. No. 14/766,586, filed Aug. 7, 2015, Lothar Stadelmeier, et al.
"Digital broadcasting (DVB); frame structure channel coding and modulation for a second generation digital terrestrial television broadcasting system (DVB-T2)", ETSI EN 302 755 V1.3.1, Nov. 2011, pp. 17-21, XP002728444.
"Frequency and network planning aspects of DVB-T2 BT Series broadcasting service (television)", International Telecommunications Union, Report ITU-R BT.2254, Sep. 20012, pp. 1-129, XP55134561.
DVB-T, Wikipedia http://en.wikipedia.org/wiki/DVB-T, Nov. 4, 2011.
ETSI EN 302 755 V1.3.1; DVB-T2 System architecture, Apr. 2012.
DVB-T2, Wikipedia http://en.wikipedia.org/wiki/DVB-T2, Apr. 30, 2011.
International Search Report issued on Sep. 2, 2014 for PCT/GB2014/050591 filed on Feb. 28, 2014.
Great Britain Search Report issued Sep. 10, 2013 for Application GB 1304529.9 filed Mar. 13, 2013.

\* cited by examiner

| FFT Size | Guard Interval Fractions | | | | | | |
|---|---|---|---|---|---|---|---|
| | 1/128 | 1/32 | 1/16 | 19/256 | 1/8 | 19/128 | 1/4 |
| 8K | PP7 [7,37,19%] | PP7 [28,37,76%] PP4 [28,75,37%] | PP8 [56,149,38%] PP4 [56,75,75%] PP5 [56,75,75%] | PP8 [67,149,45%] PP4 [67,75,89%] PP5 [67,75,89%] | PP2 [112,149,75%] PP3 [112,149,75%] PP8 [112,149,75%] | PP2 [133,149,89%] PP3 [133,149,89%] PP8 [133,149,89%] | PP1 [224,299,75%] PP8 [224,149,150%] |
| 16K | PP7 [14,75,19%] | PP7 [56,75,75%] PP4 [56,149,38%] PP6 [56,75,75%] | PP2 [112,299,37%] PP8 [112,299,37%] PP4 [112,149,75%] PP5 [112,149,75%] | PP2 [133,299,44%] PP8 [133,299,44%] PP4 [133,149,89%] PP5 [133,149,89%] | PP2 [224,299,75%] PP3 [224,299,75%] PP8 [224,299,75%] | PP2 [266,299,89%] PP3 [266,299,89%] PP8 [266,299,89%] | PP1 [448,597,75%] PP8 [448,299,150%] |
| 32K | PP7 [28,149,19%] | PP4 [112,299,37%] PP6 [112,149,75%] | PP2 [224,597,38%] PP8 [224,597,38%] PP4 [224,299,75%] | PP2 [266,597,45%] PP8 [266,597,45%] PP4 [266,299,89%] | PP2 [448,597,75%] PP8 [448,597,75%] | PP2 [532,597,89%] PP8 [532,597,89%] | NA |

PP No.[Guard Interval Duration (μs), Nyquist Limit (μs), Guard Interval Duration/Nyquist Limits x 100 (%)]

FIG. 6

| Label | Dx | Dy | Dx.Dy | Capacity Loss | Comments |
|---|---|---|---|---|---|
| P4,2 | 4 | 2 | 8 | 12.5% | NEW- does not exist in DVB T2 |
| P4,4 | 4 | 4 | 16 | 6.25% | NEW- does not exist in DVB T2 |
| P8,2 | 8 | 2 | 16 | 6.25% | NEW- does not exist in DVB T2 |
| P16,2 | 16 | 2 | 32 | 3.1% | NEW- does not exist in DVB T2 |
| P32,2 | 32 | 2 | 64 | 1.6% | NEW- does not exist in DVB T2 |

(P4,2 row annotated: "Excessive Capacity Loss: Possibly To be removed")

FIG. 8

| FFT Size | Guard Inteval Fractions | Guard Interval Duration (ms) (Assuming 6 MHz Channel Bandwidth) |
| --- | --- | --- |
| 8K | [3, 6, 12, 24, 48, 57, 96] / 512 | [7, 14, 28, 56, 112, 133, 224] |
| 16K | [3, 6, 12, 24, 48, 57, 96] / 512 | [14, 28, 56, 112, 224, 266, 448] |
| 32K | [3, 6, 12, 24, 48, 57] / 512 | [28, 56, 112, 224, 448, 532] |

FIG. 9

| FFT Size | Guard Interval Duration (ms) | Guard Inteval Fraction | | | | | | |
|---|---|---|---|---|---|---|---|---|
| | | 3/512 | 3/256 | 3/128 | 3/64 | 3/32 | 57/512 | 3/16 |
| | | 7 | 14 | 28 | 56 | 112 | 133 | 224 |
| 8K | P4 [299] | Excluded: Ratio [2%] is too small | Excluded: Ratio [5%] is too small | Excluded: Ratio [10%] is too small | Ratio = 19% | Ratio = 38% | Ratio = 45% | Ratio = 75% |
| | P8 [149] | Excluded: Ratio [5%] is too small | Excluded: Ratio [10%] is too small | Ratio = 19% | Ratio = 38% | Ratio = 75% | Ratio = 89% | Excluded: Nyq Limit<GI |
| | P16 [75] | Exclude: Ratio [9%] is too small | Ratio = 19% | Ratio = 38% | Ratio = 75% | Excluded: Nyq Limit<GI | Excluded: Nyq Limit<GI | Excluded: Nyq Limit<GI |
| | P32 [37] | Ratio = 19% | Ratio = 38% | Ratio = 75% | Excluded: Nyq Limit<GI | Excluded: Nyq Limit<GI | Excluded: Nyq Limit<GI | Excluded: Nyq Limit<GI |
| | Nyquist Limit (ms)* | | | | | | | |

FIG. 10

| FFT Size | | | Guard Inteval Fraction | | | | | | |
|---|---|---|---|---|---|---|---|---|---|
| | | | 3/512 | 3/256 | 3/128 | 3/64 | 3/32 | 57/512 | 3/16 |
| | Guard Interval Duration (ms) | | 14 | 28 | 56 | 112 | 224 | 266 | 448 |
| 16K | Nyquist Limit (ms)* | P4 [597] | Excluded: Ratio [2%] is too small | Excluded: Ratio [5%] is too small | Excluded: Ratio [9%] is too small | Ratio = 19% | Ratio = 38% | Ratio = 45% | Ratio = 75% |
| | | P8 [299] | Excluded: Ratio [5%] is too small | Excluded: Ratio [9%] is too small | Ratio = 19% | Ratio = 38% | Ratio = 75% | Ratio = 89% | Excluded: Nyq Limit < GI |
| | | P16 [149] | Exclude: Ratio [9%] is too small | Ratio = 19% | Ratio = 38% | Ratio = 75% | Excluded: Nyq Limit < GI | Excluded: Nyq Limit < GI | Excluded: Nyq Limit < GI |
| | | P32 [75] | Ratio = 19% | Ratio = 38% | Ratio = 75% | Excluded: Nyq Limit < GI | Excluded: Nyq Limit < GI | Excluded: Nyq Limit < GI | Excluded: Nyq Limit < GI |

FIG. 11

| FFT Size | | Guard Inteval Fraction | | | | | | |
|---|---|---|---|---|---|---|---|---|
| | | | 3/512 | 3/256 | 3/128 | 3/64 | 3/32 | 57/512 | 3/16 |
| | Guard Interval Duration (ms) | | 28 | 56 | 112 | 224 | 448 | 532 | 896 |
| 32K | | P4 [1195] | Excluded: Ratio [2%] is too small | Excluded: Ratio [5%] is too small | Excluded: Ratio [9%] is too small | Ratio = 19% | Ratio = 38% | Ratio = 45% | Ratio = 75% |
| | | P8 [597] | Excluded: Ratio [5%] is too small | Excluded: Ratio [9%] is too small | Ratio = 19% | Ratio = 38% | Ratio = 75% | Ratio = 89% | |
| | Nyquist Limit (ms)* | P16 [299] | Exclude: Ratio [9%] is too small | Ratio = 19% | Ratio = 38% | Ratio = 75% | Excluded: Nyq Limit < GI | Excluded: Nyq Limit < GI | Excluded: Nyq Limit < GI |
| | | P32 [149] | Ratio = 19% | Ratio = 38% | Ratio = 75% | Excluded: Nyq Limit < GI | Excluded: Nyq Limit < GI | Excluded: Nyq Limit < GI | Excluded: Nyq Limit < GI |

FIG. 12

| FFT Size | Guard Interval Fraction | | | | | | |
|---|---|---|---|---|---|---|---|
| | 3/512 | 3/256 | 3/128 | 3/64 | 3/32 | 57/512 | 3/16 |
| 8K | P32,2 | P16,2 | P8,2 | P4,2 | P4,2 | P4,2 | P4,2 |
| 16K | | P32,2 | P16,2 | P4,4 | P4,4 | P4,4 | P4,4 |
| | | | | P8,2 | P8,2 | P8,2 | |
| 32K | | | P32,2 | P16,2 | | | |

FIG. 13

| FFT Sizes | Channel Bandwidth | QAM Range | Guard Interval Fractions | Pilot Pattern Range |
|---|---|---|---|---|
| 8K, 16K, 32K (Extended & Non-Extended Bandwidth Modes) | 6 MHz | QPSK, 16QAM, 64QAM, 256QAM, 1024QAM | 3/512 | |
| | | | 6/512 | P4,2 [Dx=4, Dy=2] |
| | | | 12/512 | P4,4 [Dx=4, Dy=4] |
| | | | 24/512 | P8,2 [Dx=8, Dy=2] |
| | | | 48/512 | P16,2 [Dx=16, Dy=2] |
| | | | 57/512 | P32,2 [Dx=32, Dy=2] |
| | | | 96/512 | |

FIG. 14

6MHZ BANDWIDTH OFDM TRANSMITTER WITH THE SAME GUARD INTERVAL AS 8MHZ DVB-T2

FIELD OF DISCLOSURE

The present disclosure relates to transmitters and methods for transmitting data from Orthogonal Frequency Division Multiplexed (OFDM) symbols, the OFDM symbols including a plurality of sub-carrier symbols, some of the sub-carrier symbols being assigned to carry data and some of the sub-carrier signals being assigned to carry pilot symbols. The present disclosure also related to receivers and methods of receiving data from OFDM symbols and communications systems for communicating data using OFDM symbols.

BACKGROUND OF THE DISCLOSURE

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate an impulse response of the channel through which the OFDM symbol has passed, and to facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy.

The development of communications system which utilise OFDM symbols to communicate data can represent a significant and complex task. In particular, the optimisation of communications parameters particular in respect of frequency planning and network deployment can present a significant technical problem requiring considerable effort to identify the communications parameters which are suitable for a communications system which utilises OFDM. This can include determining a guard interval which is to be used for the OFDM symbols which determines the spacing of base stations in a single frequency network. As will be appreciated much work has been performed to optimise the parameters of DVB standards and in particular DVB T2.

SUMMARY OF DISCLOSURE

Embodiments of the present technique can provide in one example a transmitter configured to transmit data to a receiver using from Orthogonal Frequency Division Multiplexed (OFDM) symbols. The OFDM symbols include a plurality of sub-carrier symbols, some of the sub-carrier symbols carrying data symbols and some of the sub-carrier signals carrying pilot symbols. The transmitter comprises a data formatter configured to form the data for transmission into sets of data symbols for each of the OFDM symbols for transmission, and an OFDM symbol builder configured to receive each of the sets of data symbols from the data formatter and to combine the data symbols with pilot symbols according to a predetermined pattern. A modulator is configured to map the data symbols and the pilot symbols onto modulation symbols and to modulate the plurality of sub-carriers to form the OFDM symbols. An inverse Fourier transform is configured to convert the OFDM symbols from the frequency domain to the time domain, and a guard interval inserter is configured to add a guard interval to each of the OFDM symbols by copying a part of the OFDM symbols and appending the copied part sequentially in the time domain to the OFDM symbols, the part corresponding to the guard interval being a predetermined guard interval duration. A radio frequency transmission unit is configured to transmit the OFDM symbols on a radio frequency carrier. A bandwidth of the OFDM symbols is substantially 6 MHz and the guard interval duration of the OFDM symbols added by the guard interval inserter is one of 3/512, 6/512, 12/512, 24/512, 48/512, 57/512 or 96/512.

Embodiments of the present technique can form a communications system which is configured to communicate data using OFDM symbols. The communications system is adapted to use a frequency raster or channel spacing of 6 MHz but retains an efficient use of communications resources as measured for example from a ratio of the guard interval duration to a Nyquist duration limit as determined by a sampling rate in the frequency domain produced by the pilot symbol carrying sub-carriers.

In some examples a mode of operation of the transmitter includes modes which use a number of the plurality of sub-carriers of the OFDM symbols of 8K, 16K or 32K. Some embodiments of the present technique can utilise communications parameters which have been developed for the DVB-T2 standard, but adapted with a different guard interval fraction for a 6 MHz channel bandwidth by re-using the same guard interval duration. Accordingly transmitter and receiver design can be rationalised and simplified by re-using technology developed for the DVB-T2 standard.

In some embodiments the OFDM symbols are transmitted in accordance with a physical layer proposal for an Advanced Television Systems Committee standard (ATSC 3.0).

Various aspects and features of the present invention are defined in the appended claims. Further aspects of the present invention include a method of recovering data from Orthogonal Frequency Division Multiplexed (OFDM) symbols.

BRIEF DESCRIPTION OF DRAWINGS

Embodiments of the present invention will now be described by way of example only with reference to the accompanying drawings, wherein like parts are provided with corresponding reference numerals, and in which:

FIG. 6 provides a table containing pilot pattern and communication parameters for each of a plurality of guard interval fractions and three modes 8K 16 K and 32K corresponding to the DVB T2 standard;

FIG. 8 is a table providing proposed new pilot patterns PDx,Dy with an indication of a capacity loss;

FIG. 9 is a table providing for each of the plurality of guard interval fractions corresponding guard interval durations for each of three modes 8K, 16 K and 32K in accordance with the present disclosure (assuming a channel bandwidth raster of 6 MHz);

FIG. 10 is a table providing an indication of a ratio of Nyquist limits to guard interval duration percentage and Nyquist limit compared to guard interval, to exclude combinations of communications parameters for each of the plurality of guard interval fractions and Nyquist limits for an 8K mode;

FIG. 11 is a table providing an indication of a ratio of Nyquist limits to guard interval duration percentage and Nyquist limit compared to guard interval, to exclude combinations of communications parameters for each of the plurality of guard interval fractions and Nyquist limits for an 16K mode;

FIG. 12 is a table providing an indication of a ratio of Nyquist limits to guard interval duration percentage and Nyquist limit compared to guard interval, to exclude combinations of communications parameters for each of the plurality of guard interval fractions and Nyquist limits for an 32K mode;

FIG. 13 is a table providing selected pilot patterns for each of the plurality of guard interval fractions for an 8K, 16K and a 32K mode in accordance with the present disclosure;

FIG. 14 is a table summarising communications parameters for a communications system with a 6 MHz OFDM symbol bandwidth in accordance with the present technique;

DESCRIPTION OF EXAMPLE EMBODIMENTS

Figure 1:
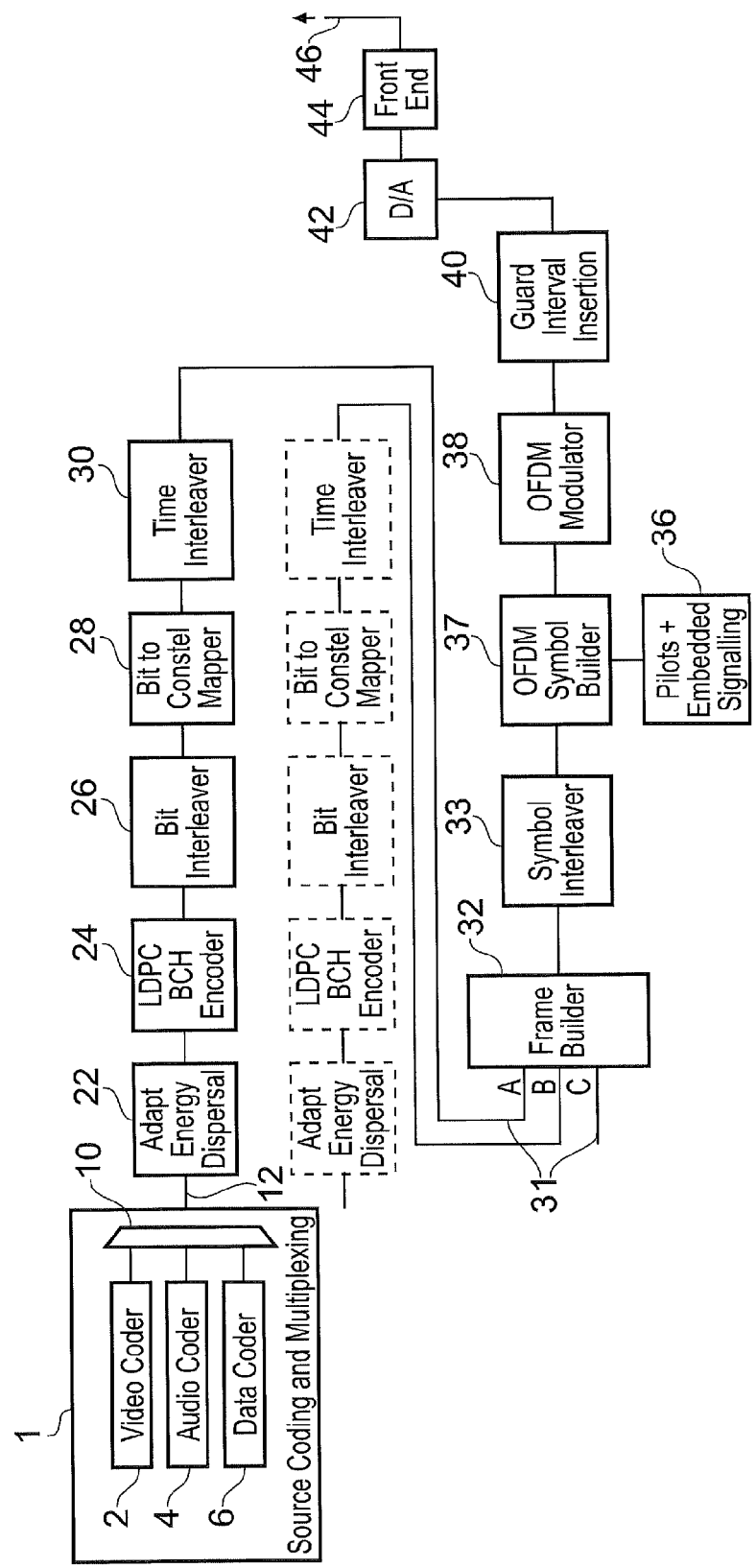
FIG. 1 is a schematic block diagram of an OFDM transmitter which may be used, for example, with the DVB-T2 standard.

FIG. 1 provides an example block diagram of an OFDM transmitter which may be used for example to transmit video images and audio signals. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 an OFDM transmitter 20 receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system. According to examples of the present technique there is proposed to be three modes, which are the 32K, 16K and 8K.

The sequence of data cells to be carried in each OFDM symbol is then passed to the symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue convertor 42 and finally to an RF amplifier within an RF front end 44 for eventual broadcast by the COFDM transmitter from an antenna 46.

Frame Format

Figure 2:
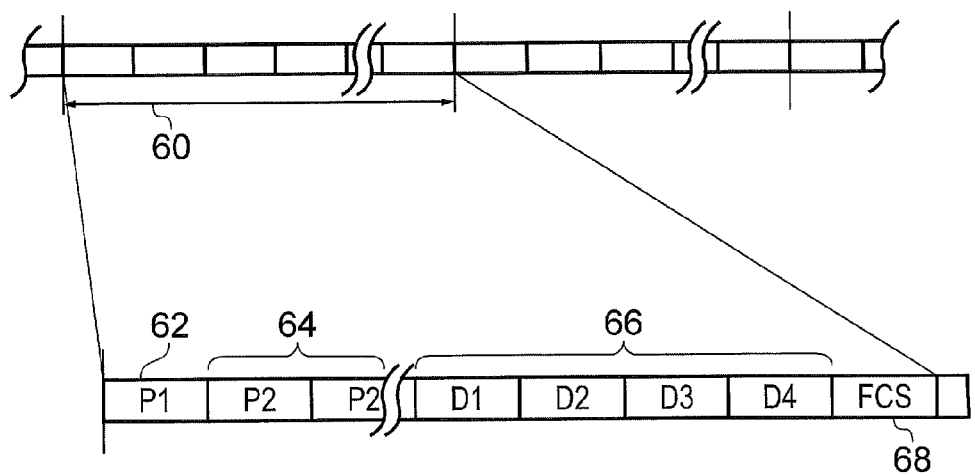
FIG. 2 is an example illustration of a super frame structure according to the DVB-T2 standard.

In some example communications systems, such as DVB-T2, the number of sub-carriers per OFDM symbol can vary depending upon the number of pilot and other reserved carriers. An example illustration of a "super frame" is shown in FIG. 2. In some examples, the number of sub-carriers for carrying data may not be fixed, but may vary within the frame, so that broadcasters can select one of the operating modes from 1 k, 2 k, 4 k, 8 k, 16 k, 32 k, each providing a range of sub-carriers for data per OFDM symbol, the maximum available for each of these modes being 1024, 2048, 4096, 8192, 16384, 32768 respectively. A physical layer frame may be composed of many OFDM symbols. In one example a transmission frame starts with a preamble or P1 symbol as shown in FIG. 2, which provides signalling information relating to the configuration of the physical layer transmission parameters, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected. As such a generalisation to a specific number of sub-carriers per OFDM symbol is difficult.

Receiver

Figure 3:
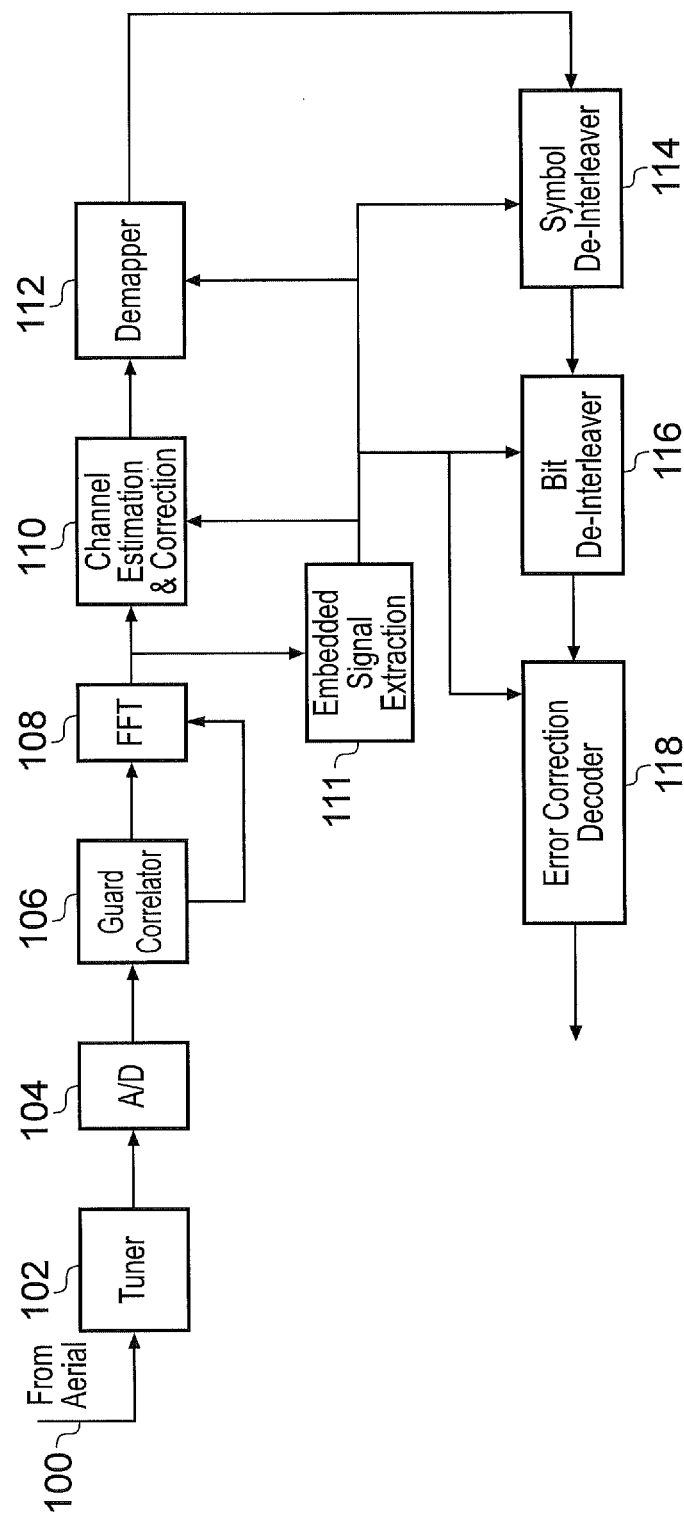
FIG. 3 is a schematic block diagram of an OFDM receiver which may be used, for example, with the DVB-T or DVB-T2 standard.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. A guard interval correlator 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

Development of OFDM Transport Structure

Embodiments of the present technique can provide a communication system which utilises OFDM to transmit data and reuses much of the system design and configuration parameters which have been adopted for the DVB-T2 standard. However the communication system is adapted and optimised to transmit OFDM symbols within channels of 6 MHz. Accordingly, the present disclosure presents an adaptation of the parameters for an OFDM system for 6 MHz but rationalising where possible the parameters that were developed for the DVB T2 standard in order to simplify architecture and implementation of a communications system.

Figure 4:
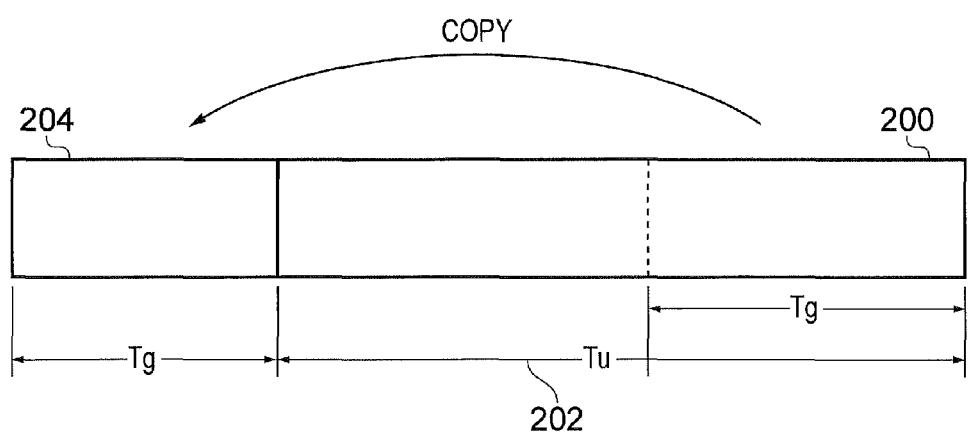
FIG. 4 is a schematic diagram representing the parts of an OFDM symbol in the time domain.

FIG. 4 provides a schematic representation of the form of an OFDM symbol in the time domain as transmitted by the transmitter shown in FIG. 1. As is conventional with an OFDM system, the OFDM symbol 200 comprises a useful part of a transmission burst in the time domain 202 and a guard part 204 which is appended to the useful part 202 by the guard interval inserter 40 in FIG. 1. As those acquainted with OFDM systems will appreciate, the guard part 204 is generated by copying samples from the useful part 202 so that at a receiver, the receiver may correlate a section corresponding to the guard part with the received OFDM symbol to detect in the time domain a position of the useful part of the OFDM symbol. Accordingly, a Fourier transform processor can perform a fast Fourier transform, FFT, to transform the OFDM symbol from the time domain to the frequency domain thereby to recover the subcarriers of the OFDM symbol in the frequency domain. The data can therefore be recovered from the subcarriers in the frequency domain.

Figure 5:
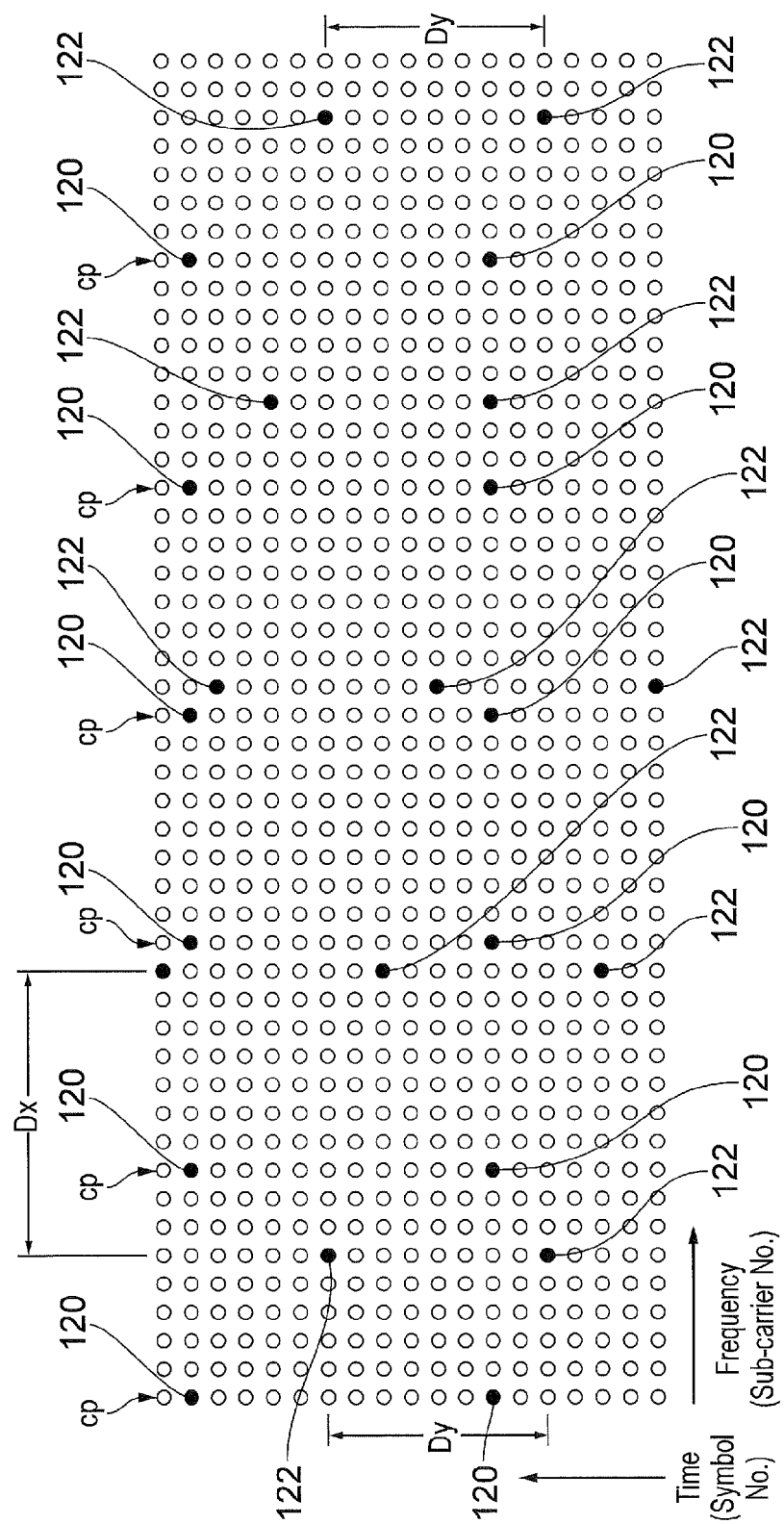
FIG. 5 is a schematic illustration of an example sequence of OFDM symbols, showing sub-carriers with scattered SP and continuous CP pilot carrier symbols.

The form of the OFDM symbols in the frequency domain is shown in FIG. 5. FIG. 5 also shows a conventional arrangement of continuous pilots CP 120 and scattered pilots SP 122. As those acquainted with OFDM systems will appreciate pilot symbols are transmitted on selected subcarriers in order to estimate an impulse response of the channel through which the OFDM symbols have passed in order to reach the receiver. The channel impulse response estimate is provided from combination of continuous pilots CP and scattered pilots SP. The continuous pilots CP are subcarriers within the OFDM symbols which always carry a pilot symbol, whereas scattered pilots SP are subcarriers which carry pilot symbols in some OFDM symbols but not others. The scattered pilots SP follow a pattern which is conventionally defined by parameters Dx, Dy. Dx represents a separation between scattered pilots in the frequency domain from one OFDM symbol to another, so that the scattered pilot symbols on a first OFDM symbol is displaced by a number of sub-carriers equal to Dx in the frequency domain on a subcarrier in the next OFDM symbol. Dy represents a scattered parameter indicating a number of OFDM symbols before the same subcarrier is used again to carry a pilot symbol on the next occasion. Therefore for the example of FIG. 5, Dx=10 and Dy=2.

As will be appreciated from the diagrams shown in FIGS. 4 and 5, the guard interval which is added to the OFDM symbols represents a transmission of redundant information which therefore uses communications resources. Accordingly the guard interval makes the transmission of data on the OFDM system less efficient. Similarly the presence of the pilot symbols transmitted on subcarriers of the OFDM symbols utilises data bearing capacity and therefore represents a reduction in efficiency with which the communications resources are used. Therefore there is an optimum value of the fraction of the guard interval with respect to the useful part of the OFDM symbol and also an optimum number of pilot symbols for a transmission channel for which the OFDM symbols are designed.

FIG. 6 presents a table showing guard interval fractions with respect to each of three modes for the DVB-T2 system. A mode represents a number of subcarriers per OFDM symbol which is typically a value of $2^n$ because these are values for which an FFT can be performed. A rationalisation of the proposed communication system provides three modes 8K, 16K or 32K. As can be seen in FIG. 6 for each of the possible guard intervals $T_g$, a guard interval fraction will result for each of the three modes 8K, 16K, 32K. In each of the elements of the table there is disclosed a pilot pattern number PPn which refers to a pattern of pilot subcarriers which have been adopted for DVB T2. For each pilot pattern number PPn there is shown in the square brackets [guard interval duration (µs), Nyquist limit (µs), ratio (%)=(GID/Nyquist limit)·100], where the ratio may also be referred to as the utilization ratio.

As explained above the parameters presented in FIG. 6 correspond to those for time and fixed interpolation in 8 MHz channels as provided by the DVB T2 system. A summary of the parameters for DVB T2 is presented below:

8K Mode

Range of Guard Interval Durations in µs are: [7, 28, 56, 67, 112, 133, 224]

Range of Nyquist limits in the time domain in µs are: [37, 75, 149, 299]

16K Mode

Range of Guard Interval Durations in µs are: [14, 56, 112, 133, 224, 266, 448]

Range of Nyquist limits in the time domain in µs are: [75, 149, 299, 597]

32K Mode

Range of Guard Interval Durations in µs are: [28, 112, 224, 266, 448, 532]

Range of Nyquist limits in the time domain in µs are: [37, 75, 149, 299]

With regard to the above modes, the full range of supported guard interval durations for DVB-T2 in µs are: [7, 14, 28, 56, 67, 112, 133, 224, 266, 448, 532], the full range of supported Nyquist limits in µs are: [37, 75, 149, 299, 597], and the full range of ratios (GID/Nyquist Limit]) are: [19%, 38%, 45%, 75%, 89%, 150%].

As explained above the present disclosure presents an adaptation of the OFDM system configuration for DVB T2 for a 6 MHz channel raster such as that which might be used for a future ATSC standard. The elementary period in µs for an 8 MHz channel is 7/64, which is the time base of the OFDM symbol. Therefore based on this unit for example, the useful time duration $T_u$ of an 8K OFDM symbol as presented in FIG. 6, can be calculated to be 896 µs. Therefore adopting the same consideration for a 6 MHz channel the elementary period in microseconds is 7/48, so that for example $T_u$ (8K)=1195 µs. This represents an increase of $T_u$ by factor of 64/48=8/6.

According to present technique the guard interval durations (GID) which are used for the DVB T2 system are also proposed for an OFDM communications system with a 6 MHz channel raster. The guard interval durations therefore determine the spacing of transmitters in a single frequency network. Accordingly, by maintaining the same GID for a 6 MHz bandwidth OFDM symbol, the spacing of transmitters can be maintained to be the same as that for DVB T2 and reused. By maintaining the same GID, the guarded interval fraction (GIF) is adjusted by a factor of 6/8 as shown in FIG. 7.

Figure 7:
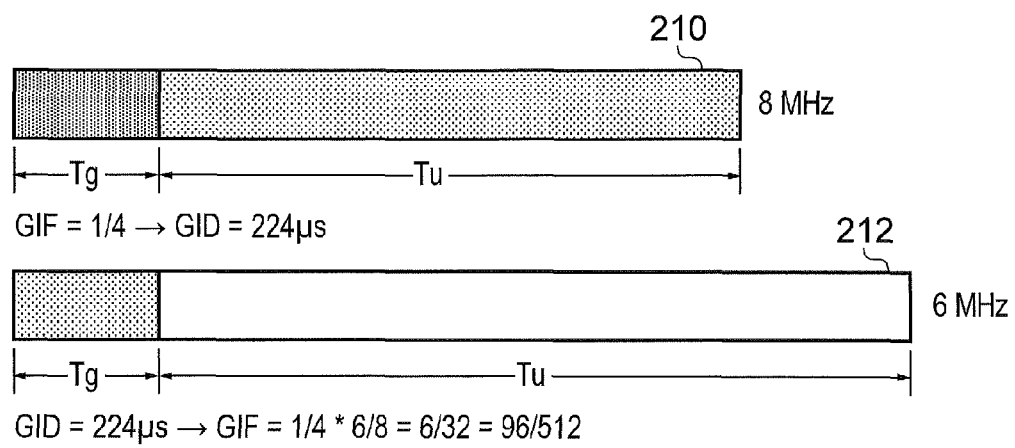
FIG. 7 is a schematic block diagram illustrating a change in a length of an OFDM symbol in which where a bandwidth of the OFDM symbols changes from 8 MHz to 6 MHz.

In FIG. 7 a representation of an OFDM symbol such as that shown in FIG. 4 for in an 8 MHz channel 210 compared to a 6 MHz channel 212 where the GID remains the same which is 224 µs. Accordingly the GIFs=1/4 so that for the 8 MHz OFDM symbol 212 with the same GID=224 MHz, the GIFs=1/4*6/8=6/32=96/512. Similarly the same calculations apply to maintaining the Nyquist duration limits in the time domain so that the Nyquist limit TP equals $T_u$, Dx where Dx is the spacing of the scattered pilot subcarriers in the frequency domain as explained above. If Tp is to be the same because $T_u$ has increased by factor of 8/6, then Dx should be scaled up by the same factor. Therefore the minimum value of Dx(8 MHz)=3, whereas minimum value Dx(6 MHz)=3*8/6=4.

As explained above, the minimum value of Dx is set to be 4 and Dy is selected to provide maximum Doppler robustness i.e. kept as small as possible. FIG. 8 provides a table presenting pilot pattern configurations for the proposed physical layer. The values of Dx and Dy correspond to those shown in FIG. 6. As shown in FIG. 8, one of the pilot patterns P4,2 220 has a capacity loss of 12.5% and therefore is discounted.

GIF for 6 MHz Channel

FIG. 9 provides a table showing the guard interval fractions and guard interval durations for each of the 8K, 16K, 32K modes of operation for a 6 MHz channel bandwidth according to the present technique. FIGS. 10, 11 and 12 provide in tabular form the ratio of GID to Nyquist limit for each of the guard interval fractions and each possible scattered pilot pattern P4, P8, P16, P32 for each of respectively the 8K, 16 K and 32K modes. As can be seen the resulting ratio percentage has been used to exclude certain guard interval durations and pilot patterns for each mode. Thus if the ratio is for example 10% or smaller then this is excluded, whereas if the Nyquist limit is less than the guard interval duration then this combination of parameters is also excluded. As a result of this analysis, and having excluded combinations of parameters which produce GID to Nyquist limit ratios which are either too low or too high, the scattered pilot patterns for each of the possible guard interval fractions for the proposed 6 MHz system for each mode is shown in FIG. 13. The parameters therefore selected in accordance with the present technique are summarised as follows:

8K Mode

Range of Guard Interval Durations in µs are: [7, 28, 56, 112, 133, 224]

Range of Nyquist limits in the time domain in µs are: [37, 75, 149, 299]

16K Mode

Range of Guard Interval Durations in µs are: [14, 56, 112, 133, 224, 266, 448]

Range of Nyquist limits in the time domain in µs are: [75, 149, 299, 597]

32K Mode

Range of Guard Interval Durations in µs are: [28, 112, 224, 266, 448, 532]

Range of Nyquist limits in the time domain in µs are: [37, 75, 149, 299]

With regard to the above modes, the full range of supported guard interval durations for the new physical layer proposal in µs are: [7, 14, 28, 56, 112, 133, 224, 266, 448, 532], the full range of supported Nyquist limits in µs are: [37, 75, 149, 299, 597], and the full range of ratios (GID/Nyquist Limit]) are: [19%, 38%, 45%, 75%, 89%].

According to present the present technique, in accordance with the identified GID set out above, a number of scattered pilot patterns can be rationalised. FIG. 13 summarises the scattered pilot patterns which have been selected. The number of scattered pilot patterns has been rationalised to four, which have been reduced from the eight possible which were proposed from DVB T2. This provides a more simple implementation particularly in terms of the FFT sizes or operating modes, scattered pilot patterns and guard interval combinations. As such a smaller set of possible combinations is provided of communications parameters whilst still maintaining the same Nyquist limits and maintaining a good guard utilisation in terms the ratio of GID to Nyquist duration limit. Furthermore the values of pilot patterns provide a variation in Dy between two and a maximum of four so that a small Dy ensures good tracking of dynamic channel variations (Doppler frequency). Furthermore, a small value for Dy decreases an acquisition time for the channel impulse response and reduces memory requirements at the receiver. Furthermore despite the increase in the OFDM symbol duration, there is a one-to-one correspondence between the guard interval durations for DVB T2 and those proposed for the 6 MHz channel bandwidth.

For the 6 MHz channel bandwidth for OFDM communication system FIG. 14 provides a summary of the parameters chosen in accordance with the present to disclosure. As will be appreciated a reasonably small set of GIF have been selected to support a larger range of GID, which match all those of the DVB-T2 except for one which is the 67 µs duration. Furthermore a smaller set of scattered pilot patterns has been identified for accurate channel equalisation in the time and frequency domains which also match by Nyquist limits for DVB T2. Furthermore the identified pilot patterns have an advantage in reducing memory requirements for the receiver and the transmitter because of the reduced set size that is required to be stored.

Summary of Operation

Figure 15:
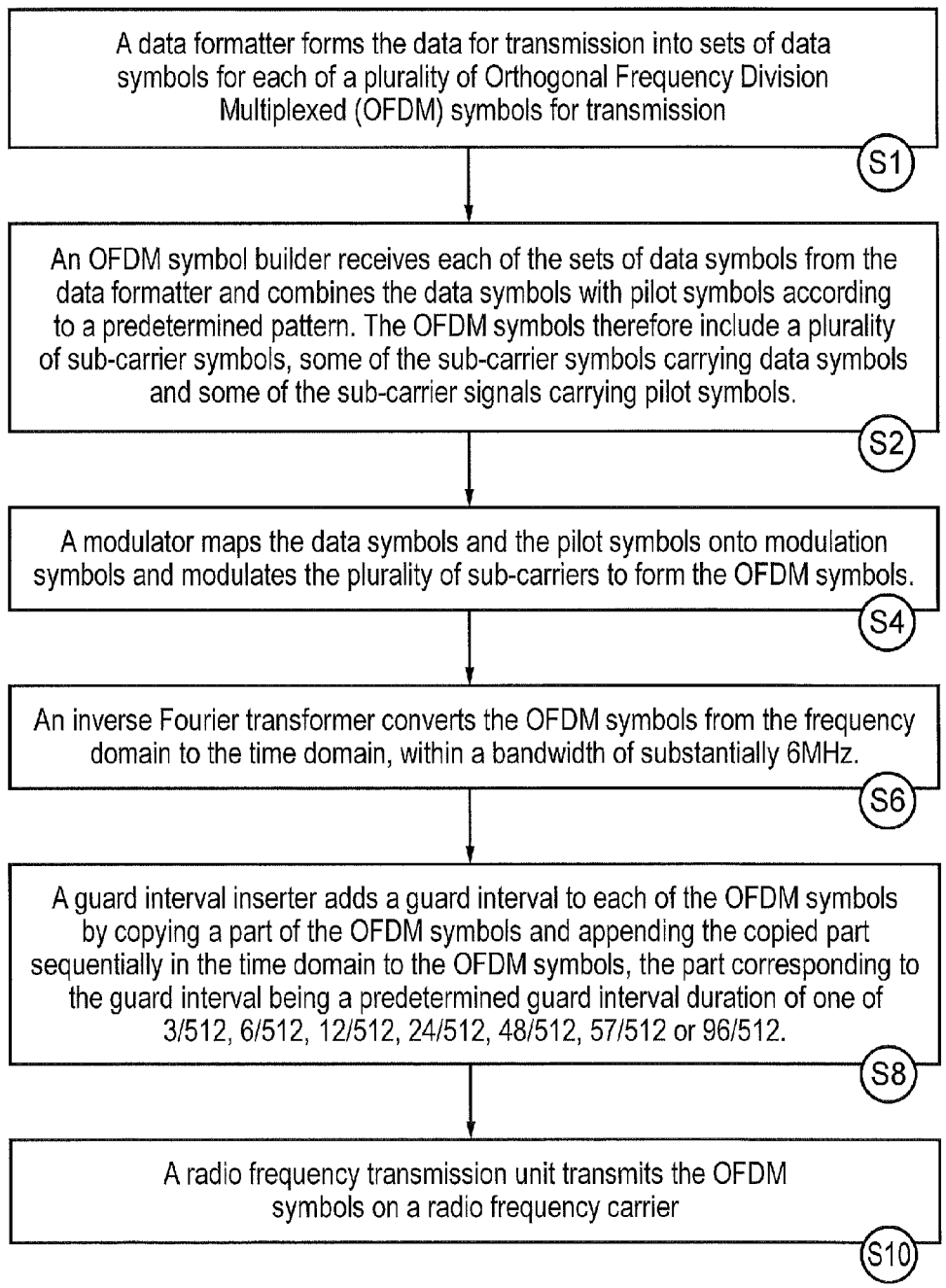
FIG. 15 is a flow diagram representing an example operation of a transmitter in accordance with the present technique.
Figure 16:
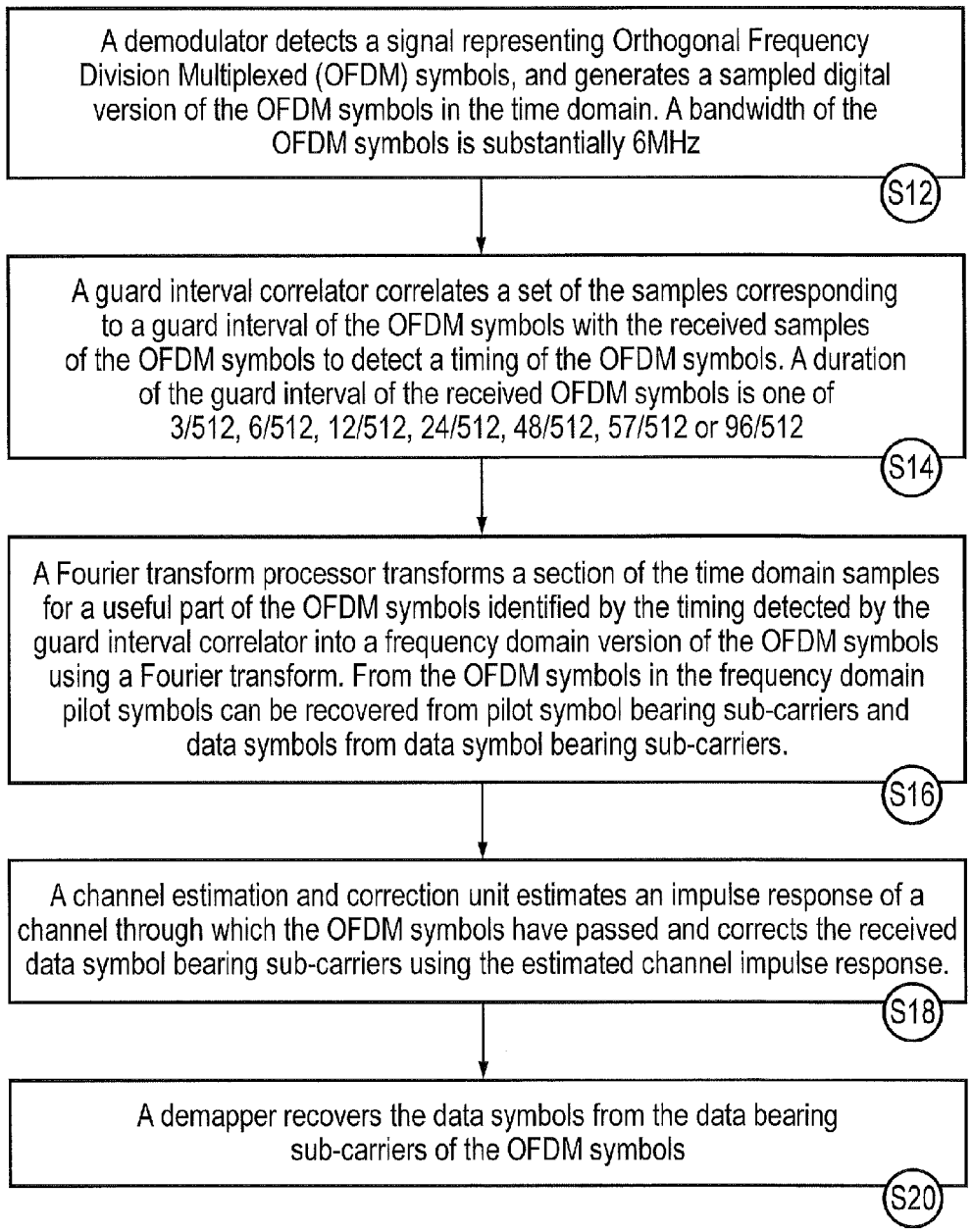
FIG. 16 is a flow diagram illustrating the operation of an example receiver in accordance with the present technique.

An example flow diagram illustrating the operation of a transmitter according to the present technique is shown in FIG. 15, and an operation of a receiver to detect and recover data from a received OFDM symbol is provided in FIG. 16. The process steps illustrated in FIG. 15 are summarised as follows:

S1: As a first step to transmitting data using OFDM symbols the data symbols for transmission are formed into sets of data symbols for each of the OFDM symbols for transmission. Thus the data symbols are formed into the sets, each set having a number of data symbols corresponding to an amount of data which can be carried by an OFDM symbol.

S2: Each of the sets of data symbols is combined with pilot symbols according to a predetermined pattern. The predetermined pattern sets out the subcarriers of the OFDM symbol which are to carry the pilot symbols. The remaining subcarriers of the OFDM symbol carry the data symbols. The OFDM symbols therefore each include a plurality of subcarrier symbols, some of the subcarrier symbols carrying data symbols and some of the subcarrier symbols carrying pilot symbols.

S4: The data symbols and the pilot symbols are then modulated to form modulation symbols in accordance with the value of the data symbols and the pilot symbols and a modulation scheme which is to be used. With the modulation symbols each of the subcarriers is then modulated to form the OFDM symbols in the frequency domain.

S6: An inverse Fourier transform is performed to convert the OFDM symbols in the frequency domain into the time domain within a bandwidth of the communication system which is 6 MHz or approximately 6 MHz.

S8: A guard interval is added to each of the time domain OFDM symbols by copying a part of the OFDM symbols which is a useful part containing data symbols or pilot symbols and appending the copied part sequentially in the time domain to the OFDM symbols. The part which is copied has a length which corresponds to a guard interval which is a predetermined guard interval duration. The predetermined guard interval duration according to the present technique is one of 3/512, 6/512, 12/512, 24/512, 48/512, 57/512 or 96/512.

S10: A radio frequency carrier is modulated with the time domain OFDM symbols and the modulated carrier is transmitted via an antenna of the transmitter.

The operation of a receiver to detect and recover data from the OFDM symbols transmitted by the method of transmission is presented in FIG. 16 which is summarised as follows:

S12: A signal representing the OFDM symbols is detected from an antenna and radio frequency down converted to form a signal representing the OFDM symbols at a base band frequency. A sampled digital version of the OFDM symbols is thereby formed in the time domain. A bandwidth of the OFDM symbols in the frequency domain in accordance with the present technique is substantially 6 MHz, that is approximately 6 MHz and in some examples 5.71 Mhz to allow for a small guard band between each 6 Mhz bandwidth.

S14: The set of samples corresponding to the guard interval of the OFDM symbols is correlated with itself, to detect a timing of a useful part of the OFDM symbols. A section of the received signal samples corresponding to the guard interval is copied and stored and then correlated with respect to the same received signal samples in order to detect a correlation peak identifying where the repeated guard intervals are present in the useful part of the OFDM symbols. A duration of the guard interval of the received OFDM symbols is one of 3/512, 6/512, 12/512, 24/512, 48/512, 57/512 or 96/512.

S16: A Fourier transform is performed to transform a section of the time domain samples of the received signal for a useful part of the OFDM symbols identified by the timing detected by the guard interval correlator into the frequency domain using a Fourier transform. From the OFDM symbols in the frequency domain the pilot symbols can be recovered from the pilot symbol bearing subcarriers and data symbols can be recovered from data bearing subcarriers.

S18: An impulse response of a channel through which the OFDM symbols have passed is then estimated from the recovered pilot symbols and the effects of the channel impulse response corrected in the received data symbols bearing subcarriers using the estimated channel impulse response. Typically this is in accordance with the equalisation technique where the received signal in the frequency domain is divided by a frequency domain representation of the channel impulse response.

S20: The data symbols are the recovered by de-mapping modulation symbol estimates, which are estimated from the data bearing subcarriers of the OFDM symbols by performing a reverse mapping to that which was performed at the transmitter.

As will be appreciated the transmitter and receiver shown in FIGS. 1 and 3 respectively are provided as illustrations only and are not intended to be limiting. For example, it will be appreciated that the present technique can be applied to a different transmitter and receiver architecture.

As explained above, embodiments of the present technique can provide a transmitter or a receiver, which may respectively operate to transmit or to receive Orthogonal Frequency Division Multiplexed (OFDM) symbols, in which the number of the plurality of sub-carriers of each of the OFDM symbols is one of substantially 8K, 16K or 32K, which define operating modes for the transmitter or the receiver respectively. In some examples, the 8 k mode is an operating mode in which the number of active or useful subcarriers is between 4097 and 8192, the 16 k mode is an operating mode in which the number of active or useful subcarriers is between 8192 and 16384, and the 32 k mode is an operating mode in which the number of active useful subcarriers is between 16385 and 32768.

Furthermore as explained above, embodiments of the present technique can provide a transmitter or a receiver, which may respectively operate to transmit or to receive Orthogonal Frequency Division Multiplexed (OFDM) symbols, substantially within a 6 MHz bandwidth. The substantially 6 MHz bandwidth may in practice provide a useful bandwidth of approximately 5.71 MHz or 5.70 MHz allowing for small guard bands and/or depending on the precise number of active sub-carriers used.

In other example embodiments there is provided a transmitter or a receiver, which may respectively operate to transmit or to receive Orthogonal Frequency Division Multiplexed (OFDM) symbols, which include a guard interval duration of the OFDM symbols, which is added by a guard interval inserter. The guard interval durations may be one of 3/512, 6/512, 12/512, 24/512, 48/512, 57/512 or 96/512. However, in some embodiments 3/512, 6/512, 12/512, 24/512, 57/512 and 96/512 is not an exhaustive list of suitable guard intervals. In other embodiments the guard interval durations are between 3/512 and 96/512.

As mentioned above, embodiments of the present invention find application with an ATSC standard such as ATSC 3.0, which are incorporated herein by reference. For example embodiments of the present invention may be used in a transmitter or receiver operating in accordance with hand-held mobile terminals. Services that may be provided may include voice, messaging, internet browsing, radio, still and/or moving video images, television services, interactive services, video or near-video on demand and option. The services might operate in combination with one another.

The following numbered clauses define further example aspects and features of the present technique:

1. A transmitter for transmitting data to a receiver using from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the transmitter comprising a data formatter configured to form the data for transmission into sets of data symbols for each of the OFDM symbols for transmission, an OFDM symbol builder configured to receive each of the sets of data symbols from the data formatter and to combine the data symbols with pilot symbols according to a predetermined pattern, a modulator configured to map the data symbols and the pilot symbols onto modulation symbols and to modulate the plurality of sub-carriers to form the OFDM symbols, an inverse Fourier transform configured to convert the OFDM symbols from the frequency domain to the time domain, a guard interval inserter configured to add a guard interval to each of the OFDM symbols by copying a part of the OFDM symbols and appending the copied part sequentially in the time domain to the OFDM symbols, the part corresponding to the guard interval being a predetermined guard interval duration, and a radio frequency transmission unit configured to transmit the OFDM symbols on a radio frequency carrier, wherein a bandwidth of the OFDM symbols is substantially 6 MHz and the guard interval duration of the OFDM symbols added by the guard interval inserter is one of 3/512, 6/512, 12/512, 24/512, 48/512, 57/512 or 96/512.

2. A transmitter according to clause 1, wherein the number of the plurality of sub-carriers of each of the OFDM symbols is one of substantially 8K, 16K or 32K, which define operating modes for the transmitter.

3. A transmitter according to clause 1 or 2, wherein the pilot symbols are positioned on sub-carriers in the OFDM symbols to provide a sampling frequency which provides a Nyquist duration limit in the time domain which exceeds a temporal length of a transmission channel between the transmitter and a receiver.

4. A transmitter according to clause 3, wherein the Nyquist limit durations in the time domain is one of 37 μs, 75 μs, 149 μs, 299 μs, 597 μs.

5. A transmitter according to any of clauses 1 to 4, wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and for each of 8K, 16K or 32K modes a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard interval added, are:

| | Guard interval duration | | | | | | |
|---|---|---|---|---|---|---|---|
| | 3/512 | 3/256 | 3/128 | 3/64 | 3/32 | 57/512 | 3/16 |
| PDxDy | P32, 2 | P16, 2 P32, 2 | P8, 2 P16, 2 P32, 2 | P4, 2 P4, 4 P8, 2 P16, 2 | P4, 2 P4, 4 P8, 2 | P4, 2 P4, 4 P8, 2 | P4, 2 P4, 4 |

6. A receiver for receiving data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the receiver comprising a demodulator arranged in operation to detect a signal representing the OFDM symbols, and to generate a sampled digital version of the OFDM symbols in the time domain, a guard interval correlator configured to correlate a set of the samples corresponding to a guard interval of the OFDM symbols with the received samples of the OFDM symbols to detect a timing of the OFDM symbols, a Fourier transform processor configured to receive the time domain digital version of the OFDM symbols and to form a frequency domain version of the OFDM symbols using a Fourier transform of a section of the time domain samples for a useful part of the OFDM symbols identified by the timing detected by the guard interval correlator, from which the pilot symbol sub-carriers and the data symbol bearing sub-carriers can be recovered, a channel estimation and correction unit configured to estimate an impulse response of a channel through which the OFDM symbols have passed using the detected pilot symbols and to correct the received data symbol bearing sub-carriers using the estimated channel impulse response, and a demapper arranged in operation to recover the data symbols from the data bearing sub-carriers of the OFDM symbols, wherein a bandwidth of the OFDM symbols is substantially 6 MHz and a duration of the guard interval of the received OFDM symbols is one of 3/512, 6/512, 12/512, 24/512, 48/512, 57/512 or 96/512.

7. A receiver according to clause 6, wherein the number of the plurality of sub-carriers of each of the OFDM symbols is one of substantially 8K, 16K or 32K, which define operating modes for the transmitter.

8. A receiver according to any of clauses 6 or 7, wherein the pilot symbols are positioned on sub-carriers in the OFDM symbols to provide a sampling frequency which provides a Nyquist duration limit in the time domain which exceeds a temporal length of a transmission channel between the transmitter and a receiver.

9. A receiver according to clause 8, wherein the Nyquist limit durations in the time domain is one of 37 μs, 75 μs, 149 μs, 299 μs, 597 μs.

10. A receiver according to any of clauses 6 to 9, wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and for each of 8K, 16K or 32K modes a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard interval added, are:

| | Guard interval duration | | | | | | |
|---|---|---|---|---|---|---|---|
| | 3/512 | 3/256 | 3/128 | 3/64 | 3/32 | 57/512 | 3/16 |
| PDxDy | P32, 2 | P16, 2<br>P32, 2 | P8, 2<br>P16, 2<br>P32, 2 | P4, 2<br>P4, 4<br>P8, 2<br>P16, 2 | P4, 2<br>P4, 4<br>P8, 2 | P4, 2<br>P4, 4<br>P8, 2 | P4, 2<br>P4, 4 |

The invention claimed is:

1. A transmitter for transmitting data to a receiver using Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the transmitter comprising:
circuitry configured to
form the data for transmission into sets of data symbols for each of the OFDM symbols for transmission,
receive each of the sets of data symbols and to combine the data symbols with pilot symbols according to a predetermined pattern,
map the data symbols and the pilot symbols onto modulation symbols and to modulate the plurality of sub-carriers to form the OFDM symbols,
convert the OFDM symbols from the frequency domain to the time domain using inverse Fourier transform,
add a guard interval to each of the OFDM symbols by copying a part of the OFDM symbols and appending the copied part sequentially in the time domain to the OFDM symbols, the part corresponding to the guard interval being a predetermined guard interval fraction, and
transmit the OFDM symbols on a radio frequency carrier, wherein a bandwidth of the OFDM symbols is substantially 6 MHz and the guard interval fraction of the OFDM symbols added by the guard interval inserter is one from a set of 3/512, 6/512, 12/512, 24/512, 48/512, 57/512 and 96/512,
wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and, for each of 8K, 16K or 32K modes, a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard interval fraction added from the set, are:

| | Guard interval duration | | | | | | |
|---|---|---|---|---|---|---|---|
| | 3/512 | 6/512 | 12/512 | 24/512 | 48/512 | 57/512 | 96/512 |
| PDxDy | P32, 2 | P16, 2<br>or<br>P32, 2 | P8, 2 or<br>P16, 2 or<br>P32, 2 | P4, 2 or<br>P4, 4 or<br>P8, 2 or<br>P16, 2 | P4, 2 or<br>P4, 4 or<br>P8, 2 | P4, 2 or<br>P4, 4 or<br>P8, 2 | P4, 2<br>or<br>P4, 4. |

2. The transmitter as claimed in claim 1, wherein the number of the plurality of sub-carriers of each of the OFDM symbols is one of substantially 8K, 16K or 32K, which define operating modes for the transmitter.

3. The transmitter as claimed claim 1, wherein the pilot symbols are positioned on sub-carriers in the OFDM symbols to provide a sampling frequency which provides a Nyquist duration limit in the time domain which exceeds a temporal length of a transmission channel between the transmitter and a receiver.

4. The transmitter as claimed in claim 3, wherein the Nyquist limit durations in the time domain is one of 37 μs, 75 μs, 149 μs, 299 μs, 597 μs.

5. A receiver for receiving data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the receiver comprising:
circuitry configured to
detect a signal representing the OFDM symbols, and to generate a sampled digital version of the OFDM symbols in the time domain,
correlate a set of the samples corresponding to a guard interval of the OFDM symbols with the received samples of the OFDM symbols to detect a timing of the OFDM symbols,
receive the time domain digital version of the OFDM symbols and to form a frequency domain version of the OFDM symbols using a Fourier transform of a section of the time domain samples for a useful part of the OFDM symbols identified by the detected, from which the pilot symbol sub-carriers and the data symbol bearing sub-carriers can be recovered,
estimate an impulse response of a channel through which the OFDM symbols have passed using the detected pilot symbols and to correct the received data symbol bearing sub-carriers using the estimated channel impulse response, and
recover the data symbols from the data bearing sub-carriers of the OFDM symbols, wherein a bandwidth of the OFDM symbols is substantially 6 MHz and a guard interval fraction of the received OFDM symbols is one from a set of 3/512, 6/512, 12/512, 24/512, 48/512, 57/512 and 96/512,
wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and, for each of 8K, 16K or 32K modes, a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard fraction added from the set, are:

| | Guard interval duration | | | | | | |
|---|---|---|---|---|---|---|---|
| | 3/512 | 6/512 | 12/512 | 24/512 | 48/512 | 57/512 | 96/512 |
| PDxDy | P32, 2 | P16, 2<br>or<br>P32, 2 | P8, 2 or<br>P16, 2 or<br>P32, 2 | P4, 2 or<br>P4, 4 or<br>P8, 2 or<br>P16, 2 | P4, 2 or<br>P4, 4 or<br>P8, 2 | P4, 2 or<br>P4, 4 or<br>P8, 2 | P4, 2<br>or<br>P4, 4. |

6. The receiver as claimed in claim 5, wherein the number of the plurality of sub-carriers of each of the OFDM symbols is one of substantially 8K, 16K or 32K, which define operating modes for the transmitter.

7. The receiver as claimed in claim 5, wherein the pilot symbols are positioned on sub-carriers in the OFDM symbols to provide a sampling frequency which provides a Nyquist duration limit in the time domain which exceeds a temporal length of a transmission channel between the transmitter and a receiver.

8. The receiver as claimed in claim 7, wherein the Nyquist limit durations in the time domain is one of 37 μs, 75 μs, 149 μs, 299 μs, 597 μs.

9. A method of transmitting data to a receiver using Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the method comprising:

forming the data for transmission into sets of data symbols for each of the OFDM symbols for transmission, receiving each of the sets of data symbols from the data formatter and combining the data symbols with pilot symbols according to a predetermined pattern, mapping the data symbols and the pilot symbols onto modulation symbols and modulating the plurality of sub-carriers to form the OFDM symbols, converting the OFDM symbols from the frequency domain to the time domain using an inverse Fourier transform, adding a guard interval to each of the OFDM symbols by copying a part of the OFDM symbols and appending the copied part sequentially in the time domain to the OFDM symbols, the part corresponding to the guard interval being a predetermined guard interval fraction, and transmitting by circuitry the OFDM symbols on a radio frequency carrier, wherein a bandwidth of the OFDM symbols is substantially 6 MHz and the guard interval fraction of the OFDM symbols added by the guard interval inserter is one from a set of 3/512, 6/512, 12/512, 24/512, 48/512, 57/512 and 96/512, wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and, for each of 8K, 16K or 32K modes, a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard interval fraction added from the set, are:

| | Guard interval fraction | | | | | | |
|---|---|---|---|---|---|---|---|
| | 3/512 | 6/512 | 12/512 | 24/512 | 48/512 | 57/512 | 96/512 |
| PDxDy | P32, 2 | P16, 2 or P32, 2 | P8, 2 or P16, 2 or P32, 2 | P4, 2 or P4, 4 or P8, 2 or P16, 2 | P4, 2 or P4, 4 or P8, 2 | P4, 2 or P4, 4 or P8, 2 | P4, 2 or P4, 4. |

10. A method of receiving data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the method comprising:

detecting a signal representing the OFDM symbols, and generating a sampled digital version of the OFDM symbols in the time domain, correlating a set of the samples corresponding to a guard interval of the OFDM symbols with the received samples of the OFDM symbols to detect a timing of the OFDM symbols, receiving the time domain digital version of the OFDM symbols and forming a frequency domain version of the OFDM symbols using a Fourier transform of a section of the time domain samples for a useful part of the OFDM symbols identified by the detected timing of the OFDM symbols, from which the pilot symbol sub-carriers and the data symbol bearing sub-carriers can be recovered, estimating an impulse response of a channel through which the OFDM symbols have passed using the detected pilot symbols and to correct the received data symbol bearing subcarriers using the estimated channel impulse response, and recovering by circuitry the data symbols from the data bearing sub-carriers of the OFDM symbols, wherein a bandwidth of the OFDM symbols is substantially 6 MHz and a guard interval fraction of the received OFDM symbols is one from a set of 3/512, 6/512, 12/512, 24/512, 48/512, 57/512 and 96/512, wherein the pilot sub-carriers for the OFDM symbols are formed from continuous pilots in which pilot symbols are transmitted on the same sub-carriers of the OFDM symbols and scattered pilots in which pilot symbols are transmitted on sub-carriers at different locations in the OFDM symbols and, for each of 8K, 16K or 32K modes, a pattern of the scattered pilots P for each guard interval fraction, having a displacement in frequency between sub-carriers which are used to carry a pilot symbol between successive OFDM symbols, Dx, and a displacement Dy between successive OFDM symbols carrying one or more pilot symbols on the same sub-carrier, for the respective guard fraction added from the set, are:

| | Guard interval fraction | | | | | | |
|---|---|---|---|---|---|---|---|
| | 3/512 | 6/512 | 12/512 | 24/512 | 48/512 | 57/512 | 96/512 |
| PDxDy | P32, 2 | P16, 2 or P32, 2 | P8, 2 or P16, 2 or P32, 2 | P4, 2 or P4, 4 or P8, 2 or P16, 2 | P4, 2 or P4, 4 or P8, 2 | P4, 2 or P4, 4 or P8, 2 | P4, 2 or P4, 4. |

* * * * *